(12) United States Patent
Subramaniyam

(10) Patent No.: US 11,083,981 B2
(45) Date of Patent: Aug. 10, 2021

(54) DEMULSIFICATION ADDITIVE COMPOSITION, USE THEREOF, AND METHOD OF DEMULSIFICATION

(71) Applicant: Dorf Ketal Chemicals (India) Private Limited, Mumbai (IN)

(72) Inventor: Mahesh Subramaniyam, Mumbai (IN)

(73) Assignee: Dorf Ketal Chemicals (India) Private Limited, Mumbai (IN)

( * ) Notice: Subject to any disclaimer, the term of this patent is extended or adjusted under 35 U.S.C. 154(b) by 223 days.

(21) Appl. No.: 16/478,899

(22) PCT Filed: Jan. 12, 2018

(86) PCT No.: PCT/IB2018/050211
§ 371 (c)(1),
(2) Date: Jul. 18, 2019

(87) PCT Pub. No.: WO2018/138595
PCT Pub. Date: Aug. 2, 2018

(65) Prior Publication Data
US 2020/0353380 A1    Nov. 12, 2020

(30) Foreign Application Priority Data

Jan. 25, 2017  (IN) .............................. 201721002955

(51) Int. Cl.
*B01D 17/04* (2006.01)
*C10G 31/08* (2006.01)
*C10G 33/04* (2006.01)

(52) U.S. Cl.
CPC ........... *B01D 17/047* (2013.01); *C10G 31/08* (2013.01); *C10G 33/04* (2013.01); *C10G 2300/80* (2013.01)

(58) Field of Classification Search
CPC ...... B01D 17/047; C10G 31/08; C10G 33/04; C10G 2300/80; C08G 8/36
See application file for complete search history.

(56) References Cited

U.S. PATENT DOCUMENTS

| | | | |
|---|---|---|---|
| 2,792,356 A | 5/1957 | De Groote | |
| 3,083,170 A | 3/1963 | Booty | |
| 5,525,201 A * | 6/1996 | Diaz-Arauzo | B01D 17/047 204/573 |
| 10,815,435 B2 * | 10/2020 | Subramaniyam | B01D 17/047 |
| 2004/0180969 A1 | 9/2004 | Lang | |
| 2017/0198204 A1 * | 7/2017 | Nguyen | C09K 8/58 |

FOREIGN PATENT DOCUMENTS

| | | |
|---|---|---|
| IN | 201721002955 | 1/2017 |
| WO | 2017001957 A1 | 1/2017 |
| WO | 2018138595 A1 | 8/2018 |

OTHER PUBLICATIONS

Foreign communication from the priority International Application No. PCT/IB2018/050211, International Search Report and Written Opinion, dated Mar. 6, 2018, 9 pages.
Foreign communication from the priority International Application No. PCT/IB2018/050211, International Preliminary Report on Patentability of the International Preliminary Examining Authority, dated Mar. 27, 2019, 24 pages.

* cited by examiner

*Primary Examiner* — Randy Boyer
*Assistant Examiner* — Juan C Valencia
(74) *Attorney, Agent, or Firm* — Conley Rose, P.C.; Rodney B. Carroll

(57) ABSTRACT

The present invention relates to a demulsification additive composition for demulsification of water-in-oil emulsion caused due to wash water in the crude oil, wherein the composition comprises:

(a) one or more demulsifiers (the component (a)); and
(b) a compound selected from the group comprising glyoxal, neutralized glyoxal, glyoxal derivative and a mixture thereof (the component (b)), and
(c) further comprises phosphoric acid (the component (c)).

The present invention also relates to a method of using the present demulsification additive composition for demulsification of water-in-oil emulsion caused due to wash water in the crude oil.

The present invention also relates to a method for demulsification of water-in-oil emulsion caused due to wash water in the crude oil by employing the present demulsification additive composition.

26 Claims, No Drawings

DEMULSIFICATION ADDITIVE COMPOSITION, USE THEREOF, AND METHOD OF DEMULSIFICATION

CROSS REFERENCE TO RELATED APPLICATIONS

This application is a filing under 35 U.S.C. 371 of International Application No. PCT/IB2018/050211 filed Jan. 12, 2018, entitled "Demulsification Additive Composition, Use Thereof, and Method of Demulsification," which claims priority to Indian Patent Application No. 201721002955 filed Jan. 25, 2017, which applications are incorporated by reference herein in their entirety.

FIELD OF THE INVENTION

The present invention relates to demulsification additive composition for demulsification of water-in-oil emulsion.

In particular, the present invention relates to demulsification additive composition for demulsification of water-in-oil emulsion caused by mixing of wash water and crude oil, more particularly caused by mixing of wash water and crude oil in the desalter unit of the refinery.

Even more particularly, the present invention relates to demulsification additive composition for demulsification of water-in-oil emulsion caused by mixing of wash water and crude oil in the desalter unit of the refinery, wherein the demulsification additive composition comprises at least a combination of:
(a) one or more demulsifiers;
(b) a compound selected from the group comprising glyoxal, neutralized glyoxal and mixture thereof; and
(c) further comprises phosphoric acid.

In one embodiment, the present invention relates to a method of demulsification of water-in-oil emulsions, particularly of water-in-oil emulsions caused by mixing of wash water and crude oil, more particularly of water-in-oil emulsions caused by mixing of wash water and crude oil in the desalter unit of the refinery by employing the demulsification additive composition of the present invention.

In another embodiment, the present invention relates to a method of using the demulsification additive composition of the present invention for demulsification of water-in-oil emulsions, particularly of water-in-oil emulsions caused by mixing of wash water and crude oil, more particularly of water-in-oil emulsions caused by mixing of wash water and crude oil in the desalter unit of the refinery.

BACKGROUND OF THE INVENTION

The water-in-oil emulsions are formed in various industrial operations, and are responsible for substantial loss of various industrial ingredients including difficulties in separation of oil. Therefore, breaking of water-in-oil emulsions during the processing of oil is the requirement of the industry, particularly of the crude oil refinery industry wherein the wash water gets mixed with crude oil in the desalter unit of the refinery and forms water-in-oil emulsion.

Presently, the water-in-oil emulsion caused by mixing of wash water and crude oil is broken by addition of demulsifier to the wash water.

The main problem of using the demulsifiers is that these are to be used in higher amounts and required continuously through the processing of crude oil, which results in substantial increase in cost of processing of crude oil.

Another problem of using the demulsifiers is that these are expensive, which also results in substantial increase in cost of processing of crude oil.

More importantly, the presently used demulsifiers are condensation product of nonyl phenols, and presently, there is a need to reduce consumption of nonyl phenols in view of their cost and environmental adverse effects.

Therefore, there is a need to reduce, if total elimination is not possible, the requirement of demulsifiers so that above-discussed problems of use of demulsifiers may, at least, be minimized without loss of or sacrificing the industrial output of the crude oil processing units.

SUMMARY OF THE INVENTION

Therefore, the present invention aims at providing a solution to above-described existing industrial problems by providing:
i) an improved and effective demulsification additive composition for demulsification of water-in-oil emulsions, and
ii) method of using the demulsification additive composition of the present invention for demulsification of water-in-oil emulsions, and
iii) method for demulsification of water-in-oil emulsions by employing the demulsification additive composition of the present invention.

OBJECTS OF THE INVENTION

Accordingly, the main object of the present invention is to provide:
i) a demulsification additive composition for demulsification of water-in-oil emulsions, particularly of water-in-oil emulsions caused by mixing of wash water and crude oil, more particularly of water-in-oil emulsions caused by mixing of wash water and crude oil in the desalter unit of the refinery.

Accordingly, the other object of the present invention is to provide:
ii) a method of demulsification of water-in-oil emulsions, particularly of water-in-oil emulsions caused by mixing of wash water and crude oil, more particularly of water-in-oil emulsions caused by mixing of wash water and crude oil in the desalter unit of the refinery by employing the demulsification additive composition of the present invention.

Accordingly, another object of the present invention is to provide:
iii) a method of using the demulsification additive composition of the present invention for demulsification of water-in-oil emulsions, particularly of water-in-oil emulsions caused by mixing of wash water and crude oil, more particularly of water-in-oil emulsions caused by mixing of wash water and crude oil in the desalter unit of the refinery.

Accordingly, an object of the present invention is to provide a demulsification additive composition for demulsification of water-in-oil emulsions, which is preferably caused by mixing of wash water and crude oil, more preferably for demulsification of the water-in-oil emulsions caused by mixing of wash water and crude oil in the desalter unit of the refinery so as to reduce the amount of the presently used demulsifiers, which are condensation product of nonyl phenols, and hence, to reduce consumption of nonyl phenols or condensation product of nonyl phenols, and thereby to reduce cost of processing and associated environmental adverse effects.

Other objects and advantages of present invention will become more apparent from the following description when read in conjunction with examples, which are not intended to limit scope of present invention.

DETAILED DESCRIPTION

With aim to overcome above-described industrial problems of the prior art and to achieve above-described objects of the present invention, the inventor has found that a composition comprising:
(a) one or more demulsifiers (may be referred to as component (a)); and
(b) a compound selected from the group comprising glyoxal, neutralized glyoxal, glyoxal derivative and a mixture thereof (may be referred to as component (b)), and
(c) further comprising phosphoric acid (may be referred to as component (c)), surprisingly and unexpectedly, substantially improves demulsification efficiency of the demulsifier (the component (a)), and thereby, results in substantial reduction of requirement of amount of the demulsifier, which results in substantial decrease in cost of processing of crude oil, and associated environmental adverse effects.

The inventor has also found that the composition of the present invention comprising a combination of the component (a), the component (b), and the component (c), surprisingly and unexpectedly, also substantially improves demulsification efficiency:
of the composition consisting of a combination of the component (a) and the component (b), and
of the composition consisting of a combination of the component (a) and the component (c).

Further, as the glyoxal and neutralized glyoxal are less expensive than the demulsifiers, it further results in substantial decrease in cost of processing of the crude oil.

Accordingly, the present invention relates to a demulsification additive composition for demulsification of water-in-oil emulsion caused due to wash water in the crude oil, wherein the composition comprises:
(a) one or more demulsifiers (the component (a)); and
(b) a compound selected from the group comprising glyoxal, glyoxal derivative, neutralized glyoxal, and a mixture thereof (the component (b)), and
(c) further comprises phosphoric acid (the component (c)).

The inventor has further found that the composition comprising a combination of the component (a) and the component (b), or comprising a combination of the component (a) and the component (b), and the component (c), wherein
the component (b) comprises one or more of the following:
Glycolic acid;
Glyoxylic Acid;
Citric acid; or
Maleic anhydride, and
the component (c) comprises phosphoric acid,
do not show an improvement in demulsification efficiency of the composition consisting of the component (a) of the present invention.

Therefore, in accordance with one of the embodiments of the present invention, the present composition does not comprise one or more of the following:
Glycolic acid;
Glyoxylic Acid;
Citric acid; or
Maleic anhydride.

In accordance with the present invention, the neutralized glyoxal is glyoxal having pH neutral to basic. The inventor has observed that the glyoxal is very acidic, and therefore, it may cause corrosion. Accordingly, neutralizing the glyoxal till its pH is neutral to basic avoids corrosion of crude oil processing unit, and still improves demulsification efficiency of the demulsifier.

In accordance with the present invention, the neutralized glyoxal is obtained by neutralizing the glyoxal with an amine or alkaline medium.

As per the present invention, the amine may include (or comprises) triethanol amine (TEA).

As per the present invention, the alkaline medium may include (or comprises) sodium hydroxide aqueous solution.

In accordance with the present invention, the neutralized glyoxal may also include (or comprise) neutralized derivative of glyoxal. Therefore, in the present invention, the term "neutralized glyoxal" or the term "neutralized derivative of glyoxal" have one and same meaning unless otherwise explicitly described.

In accordance with the present invention, the pH neutral to basic includes a pH varying from about 7 to about 12.

In accordance with the present invention, the glyoxal derivative may comprise (or include) methanol, ethanol, butanol, or ethylene glycol derivative of glyoxal, or a mixture thereof.

In accordance with one of the preferred embodiments of the present invention, the demulsifier is selected from the group comprising oxyalkylated condensation product of:
i) nonyl phenol and amyl phenol, and formaldehyde;
ii) nonyl phenol and butyl phenol, and formaldehyde;
iii) nonyl phenol and formaldehyde;
iv) amyl phenol and formaldehyde;
v) butyl phenol and formaldehyde;
vi) alkyl phenol and formaldehyde; and
vii) a mixture thereof.

In accordance with another preferred embodiment of the present invention, the demulsifier is selected from the group comprising oxyalkylated condensation product of:
i) cardanol, nonyl phenol and amyl phenol, and formaldehyde;
ii) cardanol, nonyl phenol and butyl phenol, and formaldehyde;
iii) cardanol, nonyl phenol and formaldehyde;
iv) cardanol, amyl phenol and formaldehyde;
v) cardanol, butyl phenol and formaldehyde;
vi) cardanol, alkyl phenol and formaldehyde; and
vii) a mixture thereof.

In accordance with one of the preferred embodiments of the present invention, the demulsifier is selected from the group comprising:
i) oxyalkylated nonyl phenol and amyl phenol formaldehyde copolymers;
ii) oxyalkylated nonyl phenol and butyl phenol formaldehyde copolymers;
iii) oxyalkylated nonyl phenol formaldehyde polymers;
iv) oxyalkylated amyl phenol formaldehyde polymers;
v) oxyalkylated butyl phenol formaldehyde polymers;
vi) oxyalkylated alkyl phenol formaldehyde polymers; and
vii) a mixture thereof.

In accordance with one of the preferred embodiments of the present invention, the demulsifier may be selected from a group comprising:

i) oxyalkylated cardanol, nonyl phenol and amyl phenol, and formaldehyde copolymers;
ii) oxyalkylated cardanol, nonyl phenol and butyl phenol, and formaldehyde copolymers;
iii) oxyalkylated cardanol, nonyl phenol and formaldehyde polymers;
iv) oxyalkylated cardanol, amyl phenol and formaldehyde polymers;
v) oxyalkylated cardanol, butyl phenol and formaldehyde polymers;
vi) oxyalkylated cardanol, alkyl phenol and formaldehyde polymers; and
vii) a mixture thereof.

In accordance with one of the preferred embodiments of the present invention, the oxyalkylated product is an ethylene oxide derivative, propylene oxide derivative, butylene oxide derivative or a mixture thereof. In accordance with one of the preferred embodiments of the present invention, the oxyalkylated product is an oxyalkylated copolymer or an oxyalkylated polymer or an oxyalkylated resin. In accordance with one of the preferred embodiments of the present invention, the oxyalkylated product is a base catalyzed oxyalkylated copolymer or a base catalyzed oxyalkylated polymer or a base catalyzed oxyalkylated resin of one or more of the said phenolic compound (i.e. cardanol, nonyl phenol, butyl phenol, amyl phenol, alkyl phenol) and formaldehyde. In accordance with one of the preferred embodiments of the present invention, the oxyalkylated product is the oxyalkylated phenol formaldehyde resin, oxyalkylated phenol formaldehyde polymer, or oxyalkylated phenol formaldehyde copolymer.

In accordance with one of the embodiments of the present invention, the phenolic reactants include alkyl phenols comprising alkyl group. In accordance with one of the embodiments of the present invention, the alkyl group comprises from about 1 to about 20 carbon atoms. In accordance with one of the embodiments of the present invention, the substitution may be of butyl, amyl, nonyl, hexyl, octyl, isooctyl, decyl, or dodecyl group.

It may be noted that term "copolymer" means a polymer made from two different phenols and the term "polymer" means a polymer made from one phenol, and resin is intended to include the polymers and copolymers.

In accordance with the one of the embodiments of the present invention, the reaction of alkyl phenol formaldehyde resin with alkylene oxide forms a high molecular weight oxyalkylated alkyl phenol formaldehyde resin.

In accordance with the one of the embodiments of the present invention, the alkylene oxide comprises ethylene oxide, propylene oxide, butylene oxide or a mixture thereof, preferably the alkylene oxide comprises ethylene oxide, propylene oxide, or a mixture thereof.

In accordance with the one of the preferred embodiments of the present invention, the molecular weight of the demulsifier of the present invention may vary from about 1000 to about 20000 daltons, preferably from about 2000 to about 15000 daltons, more preferably from about 2000 to about 10000 daltons as measured by Gel Permeation Chromatography (GPC) using the tetrahydrofuran (THF) as solvent.

In accordance with the one of the embodiments of the present invention, the average molecular weight of the demulsifier of the present invention may vary from about 1000 to about 20000 daltons, preferably from about 2000 to about 15000 daltons, more preferably from about 2000 to about 10000 daltons as measured by Gel Permeation Chromatography (GPC) using the tetrahydrofuran (THF) as solvent.

In accordance with the present invention, the composition comprises:
a) the component (a) in an amount varying from about 99.1% to about 0.1% by weight of the total composition;
b) the component (b) in an amount varying from about 0.1% to about 99.1% by weight of the total composition; and
c) the component (c) in an amount varying from about 0.1% to about 99.1% by weight of the total composition, depending upon the nature of the water-in-oil emulsion to be treated.

It may be noted that as per present invention, the additive composition may be added to the crude oil phase or to the desalter wherein wash water is mixed with crude oil and forms a water-in-oil emulsion.

It may also be noted that the scope of the present invention is not limited by the crude oil or the wash water.

Accordingly, in another embodiment, the present invention relates to a method of demulsification of water-in-oil emulsions, particularly of water-in-oil emulsions formed by mixing of wash water and crude oil, more particularly of water-in-oil emulsions formed by mixing of wash water and crude oil in the desalter unit of the refinery, wherein the water-in-oil emulsion formed due to mixing of wash water in the crude oil is treated with the presently provided demulsification additive composition.

Accordingly, in still another embodiment, the present invention also relates to a method of using the presently provided demulsification additive composition for demulsification of water-in-oil emulsions, particularly of water-in-oil emulsions formed by mixing of wash water and crude oil, more particularly of water-in-oil emulsions formed by mixing of wash water and crude oil in the desalter unit of the refinery, wherein the presently provided demulsification additive composition is added to the water-in-oil emulsion formed due to mixing of wash water in the crude oil. It may be noted that the scope of the present invention is not limited by amount of the additive composition of the present invention, which has to be added in an amount sufficient for demulsification of the water-in-oil emulsions.

EXAMPLES

The present invention is now described with the help of following examples, which are not intended to limit scope of the present invention, but have been incorporated for the sake of illustrating the advantages of the present invention over the prior art.

The following examples were carried out under the following conditions:

| PED No 1315 | |
| --- | --- |
| Crude: | Raw Crude |
| API: | 28.1 |
| Wash Water: | 5% (HMEL, ID 443), pH-8.1 |
| Mixing Temp: | 55° C. |
| Mixing time: | 2 min |
| Temp: | 130° C. |
| Voltage: | 3 KV for 8 min |

In the following examples, the following compositions have been tested for their demulsification efficiency.

1. Component (a) is demulsifier, which is 50% active nonylphenol formaldehyde ethoxylate resin (or may be a base catalysed nonylphenol formaldehyde resin);

2. Component (b) of the present invention is glyoxal or neutralized glyoxal, wherein the glyoxal has been neutralized with triethanol amine (TEA);

3. Component (c) of the present invention is phosphoric acid;

4. Comparative component may be selected from glycolic acid, glyoxylic Acid, citric acid, and maleic anhydride. In the following experiments these have been identified as follows and are taken in 14% by weight of DM (demineralized water):

Comparative component (b1) is glycolic acid (40%);

Comparative component (b2) is glyoxylic acid (40%);

Comparative component (b3) is citric acid (40%);

Comparative component (b4) is maleic anhydride (40%).

5. Comparative compositions do not comprise the combination of the component (b) and the component (c) of the present invention.

The 'blank' is without any additive.

TABLE I

| Additive Composition | Dosage (in ppm) | 20 min 130° C. | 3 KV 8 min | 5 min | 10 min | 15 min | 20 min | Demulsification/ Dehydration (in %) |
|---|---|---|---|---|---|---|---|---|
| Blank | — | Nil | Nil | 0.1 | 0.1 | 0.15 | 0.15 | 3.0 |
| Component (a) (Comparative Composition) | 10 | Nil | 2.0 | 2.2 | 2.4 | 2.6 | 2.8 | 56.0 |
| Component (a) + Component (b) (Comparative Composition) | 10 + 3 | Nil | 2.4 | 2.8 | 3.0 | 3.2 | 3.7 | 74.0 |
| Component (a) + Component (c) (Comparative Composition) | 10 + 3 | Nil | 1.8 | 2.2 | 2.4 | 2.6 | 2.8 | 56.0 |
| 10 ppm of Component (a) + 3 ppm of [Component (b) + Component (c)] (Present Composition) | 10 + 3 | Nil | 2.8 | 3.0 | 3.5 | 3.7 | 4.2 | 84.0 |

In above Table I, dosage '10+3' indicates that the additive comprises 10 ppm of Component (a) and 3 ppm of Comparative component (b1), and so on.

However, in above Table I, the 'Present Composition' comprises 10 ppm of Component (a) and 3 ppm of [Component (b)+Component (c)], wherein the [Component (b)+ Component (c)] comprises the Component (b) which is glyoxal (40%) and the Component (c) which is $H_3PO_4$ (85%) in DM (demineralized water) water in a weight ratio of 14/0.43/85.57.

As can be observed from above Table I, the composition of the present invention demonstrates 84% efficiency as against 56% or 74% efficiency of the comparative compositions.

TABLE II

| Additive Composition | Dosage (in ppm) | 20 min 130° C. | 3 KV 8 min | 5 min | 10 min | 15 min | 20 min | Demulsification/ Dehydration (in %) |
|---|---|---|---|---|---|---|---|---|
| Component (a) + Comparative component (b1) (Comparative Composition) | 10 + 3 | Nil | 2.0 | 2.2 | 2.6 | 2.6 | 2.8 | 56.0 |
| Component (a) + with Comparative composition (B) (Comparative Composition) | 10 + 3 | Nil | 2.2 | 2.6 | 2.6 | 2.8 | 3.0 | 60.0 |
| Component (a) + Comparative component (b2) (Comparative Composition) | 10 + 3 | Nil | 2.0 | 2.2 | 2.4 | 2.6 | 2.8 | 56.0 |

TABLE II-continued

| Additive Composition | Dosage (in ppm) | 20 min 130° C. | 3 KV 8 min | 5 min | 10 min | 15 min | 20 min | Demulsification/ Dehydration (in %) |
|---|---|---|---|---|---|---|---|---|
| Component (a) + Comparative composition (C) (Comparative Composition) | 10 + 3 | Nil | 2.2 | 2.2 | 2.4 | 2.6 | 2.8 | 56.0 |
| Component (a) + Comparative component (b3) (Comparative Composition) | 10 + 3 | Nil | 2.0 | 2.2 | 2.4 | 2.6 | 2.8 | 56.0 |
| Component (a) + Comparative composition (D) (Comparative Composition) | 10 + 3 | Nil | 2.0 | 2.2 | 2.4 | 2.6 | 2.8 | 56.0 |
| Component (a) + Comparative component (b4) (Comparative Composition) | 10 + 3 | Nil | 1.8 | 2.2 | 2.4 | 2.6 | 2.8 | 56.0 |
| Component (a) + Comparative composition (E) (Comparative Composition) | 10 + 3 | Nil | 2.0 | 2.2 | 2.4 | 2.6 | 2.8 | 56.0 |

In above Table II, dosage '10+3' indicates that the additive comprise 10 ppm of Component (a) and 3 ppm of second component, i.e. Comparative component (b1), Comparative composition (B), Comparative component (b2), Comparative composition (C), Comparative component (b3), Comparative composition (D), Comparative component (b4), Comparative composition (E).

In above Tables I and II, the various components have following composition:

Component (a) is 50% active nonyl phenol formaldehyde ethoxylate resin (oxyalkylated condensation product);

Component (b) comprises glyoxal (40%) in 14% DM water;

Component (c) comprises $H_3PO_4$ (85%) in 0.43% of DM water;

Present Composition comprises in-addition to the Component (a), the Component (b) which is glyoxal (40%) and the Component (c) which is $H_3PO_4$ (85%) in DM water in a weight ratio of 14/0.43/85.57;

Comparative component (b1) is glycolic acid (40%) in 14% DM water; Comparative composition (B) comprises Comparative component (b1) which is glycolic acid (40%) and the component (c) which is $H_3PO_4$ (85%) in DM water in a weight ratio of 14/0.43/85.57;

Comparative component (b2) is glyoxylic acid (40%) in 14% by weight of DM water; Comparative composition (C) comprises Comparative component (b2) which is Glyoxylic acid (40%) and component (c) which is $H_3PO_4$ (85%) in DM water in a weight ratio of 14/0.43/85.57;

Comparative component (b3) is citric acid (40%) in 14% by weight of DM water;

Comparative composition (D) comprises Comparative component (b3) which is Citric acid (40%) and component (c) which is $H_3PO_4$ (85%) in DM water in a weight ratio of 14/0.43/85.57;

Comparative component (b4) is maleic anhydride (40%) in 14% by weight of DM water;

Comparative composition (E) comprises Comparative component (b4) which is maleic anhydride (40%) and component (c) which is $H_3PO_4$ (85%) in DM water in a weight ratio of 14/0.43/85.57.

As can be observed from above Table II, all of the comparative compositions only demonstrate 56% or 60% efficiency.

TABLE III

| Additive Composition | Dosage (in ppm) | 20 min 130° C. | 3 KV 8 min | 5 min | 10 min | 15 min | Demulsification/ Dehydration (in %) |
|---|---|---|---|---|---|---|---|
| Component (a) (Comparative Composition) | 15 | Nil | 2.0 | 2.2 | 2.4 | 2.8 | 56 |
| Component (a) + Component (b) (Comparative Composition) | 15 + 0.9 | Nil | 2.6 | 2.8 | 3.5 | 3.7 | 74 |

TABLE III-continued

| Additive Composition | Dosage (in ppm) | 20 min 130° C. | 3 KV 8 min | 5 min | 10 min | 15 min | Demulsification/ Dehydration (in %) |
|---|---|---|---|---|---|---|---|
| Component (a) + Component (b) + Component (c) (Present Composition) | 15 + 0.9 | Nil | 3.2 | 3.5 | 4.0 | 4.5 | 90 |

In Table III, the mixing time was 2 min and mixing temperature was 55° C., and the component (b) is 0.9 ppm of glyoxal (40%) in DM water, and the 0.9 ppm of component (c) comprises 0.87 ppm of glyoxal (40%) and 0.03 ppm of $H_3PO_4$ (85%) in DM [i.e. 97% by weight of glyoxal (40%) and 3% by weight of $H_3PO_4$ (85%) in DM]; and the component (a) is 50% active ethoxylated nonyl phenol cardanol formaldehyde resin, which is ethoxylated condensation product of 90% by weight of nonyl phenol and 10% by weight of cardanol.

As can be observed from above Table III, the composition of the present invention demonstrates 90% efficiency as against 56% or 74% efficiency of the comparative compositions.

TABLE IV

| Additive Composition | Dosage (in ppm) | 20 min 130° C. | 3 KV 8 min | 5 min | 10 min | 15 min | 20 min | Demulsification/ Dehydration (in %) |
|---|---|---|---|---|---|---|---|---|
| Component (a) (Comparative Composition) | 15 | 0 | 1.8 | 2.4 | 2.8 | 3.0 | 3.0 | 60 |
| Component (a) + Component (b) (Comparative Composition) | 15 + 0.9 | 0 | 2.4 | 3.2 | 3.5 | 3.7 | 3.7 | 74 |
| Component (a) + Component (b) + Component (c) (Present Composition) | 15 + 0.9 | 0 | 2.6 | 3.6 | 3.8 | 4.2 | 4.2 | 84 |

In Table IV, the mixing time was again 2 min and mixing temperature was again 55° C., and the component (b) is 0.9 ppm of glyoxal (40%) in DM water, and the 0.9 ppm of component (c) comprises 0.846 ppm of glyoxal (40%) and 0.054 ppm of $H_3PO_4$ (85%) in DM [i.e. 94% by weight of glyoxal (40%) and 6% by weight of H3PO4 (85%) in DM]; and the component (a) is 50% active ethoxylated nonyl phenol para tertiary amyl phenol formaldehyde resin, which is ethoxylated condensation product of 50% by weight of nonyl phenol and 50% by weight of para tertiary amyl phenol.

As can be observed from above Table IV, the composition of the present invention demonstrates 84% efficiency as against 60% or 74% efficiency of the comparative compositions.

TABLE V

| Additive Composition | Dosage (in ppm) | 20 min 130° C. | 3 KV 8 min | 5 min | 10 min | 15 min | 20 min | Demulsification/ Dehydration (in %) |
|---|---|---|---|---|---|---|---|---|
| Component (a) (Comparative Composition) | 15 | 0.20 | 2.0 | 2.2 | 2.4 | 2.6 | 2.8 | 56 |
| Component (a) + Component (b) (Comparative Composition) | 15 + 1.2 | 0.25 | 2.4 | 2.8 | 3.2 | 3.5 | 3.7 | 74 |

TABLE V-continued

| Additive Composition | Dosage (in ppm) | Water Drop, ml | | | | | | Demulsification/ Dehydration (in %) |
|---|---|---|---|---|---|---|---|---|
| | | 20 min 130° C. | 3 KV 8 min | 5 min | 10 min | 15 min | 20 min | |
| Component (a) + Component (b) + Component (c) (Present Composition) | 15 + 1.2 | 0.25 | 2.8 | 3.2 | 3.7 | 4.0 | 4.2 | 84 |

In Table V, the mixing time was again 2 min and mixing temperature was again 55° C., and the component (b) is 1.2 ppm of glyoxal (40%) in DM water, and the 1.2 ppm of component (c) comprises 1.164 ppm of glyoxal (40%) and 0.036 ppm of $H_3PO_4$ (85%) in DM [i.e. 97% by weight of glyoxal (40%) and 3% by weight of H3PO4 (85%) in DM]; and the component (a) is 50% active ethoxylated nonyl phenol para tertiary butyl phenol formaldehyde resin, which is ethoxylated condensation product of 90% by weight of nonyl phenol and 10% by weight of para tertiary butyl phenol.

As can be observed from above Table IV, the composition of the present invention demonstrates 84% efficiency as against 56% or 74% efficiency of the comparative compositions.

In the foregoing examples, the present additive composition and the prior art or comparative additive composition was added to the water-in-oil emulsion of water and crude oil formed after mixing of water and crude oil.

The above experimental results confirm the above-discussed surprising and unexpected technical advantages of the present invention. Particularly these experiments confirm that the present additive composition comprising the Component (a), the Component (b) of the present invention and the Component (c) of the present invention demonstrates surprising and unexpected technical advantages.

It may be noted that the term "about" as employed herein is not intended to enlarge scope of claimed invention, but has been incorporated only to include permissible experimental errors of the field of the present invention.

The invention claimed is:

1. A demulsification additive composition, wherein the composition comprises: (a) component (a) being at least one demulsifier comprising oxyalkylated alkyl phenol formaldehyde polymer or co-polymer or resin, or oxyalkylated condensation product of at least one alkyl phenol and formaldehyde; (b) component (b) being selected from the group comprising glyoxal derivative, neutralized glyoxal, neutralized derivative of glyoxal, and a mixture thereof, and (c) component (c) comprising phosphoric acid; and wherein when the component (b) is the glyoxal derivative, then the glyoxal derivative comprises methanol, ethanol, butanol, or ethylene glycol derivative of glyoxal, or a mixture thereof.

2. The demulsification additive composition as claimed in claim 1, wherein the demulsifier is selected from the group comprising oxyalkylated condensation product of:
   i) nonyl phenol and amyl phenol, and formaldehyde;
   ii) nonyl phenol and butyl phenol, and formaldehyde;
   iii) nonyl phenol and formaldehyde;
   iv) amyl phenol and formaldehyde;
   v) butyl phenol and formaldehyde;
   vi) alkyl phenol and formaldehyde; and
   vii) a mixture thereof.

3. The demulsification additive composition as claimed in claim 1, wherein the demulsifier is selected from the group comprising oxyalkylated condensation product of:
   i) cardanol, nonyl phenol and amyl phenol, and formaldehyde;
   ii) cardanol, nonyl phenol and butyl phenol, and formaldehyde;
   iii) cardanol, nonyl phenol and formaldehyde;
   iv) cardanol, amyl phenol and formaldehyde;
   v) cardanol, butyl phenol and formaldehyde;
   vi) cardanol, alkyl phenol and formaldehyde; and
   vii) a mixture thereof.

4. The demulsification additive composition as claimed in claim 1, wherein the said oxyalkylated is derivative of ethylene oxide, propylene oxide, or mixture thereof.

5. The demulsification additive composition as claimed in claim 1, wherein the demulsifier is selected from the group comprising:
   i) oxyalkylated nonyl phenol and amyl phenol formaldehyde copolymers;
   ii) oxyalkylated nonyl phenol and butyl phenol formaldehyde copolymers;
   iii) oxyalkylated nonyl phenol formaldehyde polymers;
   iv) oxyalkylated amyl phenol formaldehyde polymers;
   v) oxyalkylated butyl phenol formaldehyde polymers;
   vi) oxyalkylated alkyl phenol formaldehyde polymers; and
   vii) a mixture thereof.

6. The demulsification additive composition as claimed in claim 1, wherein the demulsifier is selected from a group comprising:
   i) oxyalkylated cardanol, nonyl phenol and amyl phenol, and formaldehyde copolymers;
   ii) oxyalkylated cardanol, nonyl phenol and butyl phenol, and formaldehyde copolymers;
   iii) oxyalkylated cardanol, nonyl phenol and formaldehyde polymers;
   iv) oxyalkylated cardanol, amyl phenol and formaldehyde polymers;
   v) oxyalkylated cardanol, butyl phenol and formaldehyde polymers;
   vi) oxyalkylated cardanol, alkyl phenol and formaldehyde polymers; and
   vii) a mixture thereof.

7. The demulsification additive composition as claimed in claim 1, wherein the composition comprises:
   a) the component (a) in an amount varying from about 99.1% to about 0.1% by weight of the total composition;
   b) the component (b) in an amount varying from about 0.1% to about 99.1% by weight of the total composition; and
   c) the component (c) in an amount varying from about 0.1% to about 99.1% by weight of the total composition, depending upon the nature of the water-in-oil emulsion to be treated.

8. The demulsification additive composition as claimed in claim 1, wherein the molecular weight of the demulsifier varies from about 1000 to about 20000 daltons as measured by Gel Permeation Chromatography (GPC) using the tetrahydro furan (THF) as solvent.

9. The demulsification additive composition as claimed in claim 1, wherein the composition does not comprise:
(i) glycolic acid;
(ii) glyoxylic Acid;
(iii) citric acid; and
(iv) maleic anhydride.

10. A method of demulsification of water-in-oil emulsions, wherein the water-in-oil emulsion is treated with the demulsification additive composition as claimed in claim 1,
wherein the water-in-oil emulsion is caused by mixing a wash water and a crude oil; and wherein the step of treatment is carried out by adding the demulsification additive composition to the water-in-oil emulsion for demulsification of the water-in-oil emulsion.

11. The method as claimed in claim 10, wherein the water-in-oil emulsions is caused by mixing the wash water and the crude oil in a desalter unit of a refinery.

12. A method of using the demulsification additive composition as claimed in claim 1 for demulsification of a water-in-oil emulsion,
wherein the water-in-oil emulsion is caused by mixing a wash water and a crude oil; and wherein the demulsification additive composition is added to the water-in-oil emulsion for demulsification of the water-in-oil emulsion.

13. The method as claimed in claim 12, wherein the water-in-oil emulsions is caused by mixing the wash water and the crude oil in a desalter unit of a refinery.

14. A demulsification additive composition, wherein the composition comprises: (a) component (a) being at least one demulsifier comprising oxyalkylated alkyl phenol formaldehyde polymer or co-polymer or resin, or oxyalkylated condensation product of at least one alkyl phenol and formaldehyde; (b) component (b) being selected from the group comprising, glyoxal derivative, neutralized glyoxal, neutralized derivative of glyoxal, and a mixture thereof, and (c) component (c) comprising phosphoric acid; and wherein the component (b) is the neutralized glyoxal, then the neutralized glyoxal is glyoxal having pH neutral to basic varying from about 7 to about 12.

15. The demulsification additive composition as claimed in claim 14, wherein the demulsifier is selected from the group comprising oxyalkylated condensation product of:
i) nonyl phenol and amyl phenol, and formaldehyde;
ii) nonyl phenol and butyl phenol, and formaldehyde;
iii) nonyl phenol and formaldehyde;
iv) amyl phenol and formaldehyde;
v) butyl phenol and formaldehyde;
vi) alkyl phenol and formaldehyde; and
vii) a mixture thereof.

16. The demulsification additive composition as claimed in claim 14, wherein the demulsifier is selected from the group comprising oxyalkylated condensation product of:
i) cardanol, nonyl phenol and amyl phenol, and formaldehyde;
ii) cardanol, nonyl phenol and butyl phenol, and formaldehyde;
iii) cardanol, nonyl phenol and formaldehyde;
iv) cardanol, amyl phenol and formaldehyde;
v) cardanol, butyl phenol and formaldehyde;
vi) cardanol, alkyl phenol and formaldehyde; and
vii) a mixture thereof.

17. The demulsification additive composition as claimed in claim 14, wherein the said oxyalkylated is derivative of ethylene oxide, propylene oxide, or mixture thereof.

18. The demulsification additive composition as claimed in claim 14, wherein the demulsifier is selected from the group comprising:
i) oxyalkylated nonyl phenol and amyl phenol formaldehyde copolymers;
ii) oxyalkylated nonyl phenol and butyl phenol formaldehyde copolymers;
iii) oxyalkylated nonyl phenol formaldehyde polymers;
iv) oxyalkylated amyl phenol formaldehyde polymers;
v) oxyalkylated butyl phenol formaldehyde polymers;
vi) oxyalkylated alkyl phenol formaldehyde polymers; and
vii) a mixture thereof.

19. The demulsification additive composition as claimed in claim 14, wherein the demulsifier is selected from a group comprising:
i) oxyalkylated cardanol, nonyl phenol and amyl phenol, and formaldehyde copolymers;
ii) oxyalkylated cardanol, nonyl phenol and butyl phenol, and formaldehyde copolymers;
iii) oxyalkylated cardanol, nonyl phenol and formaldehyde polymers;
iv) oxyalkylated cardanol, amyl phenol and formaldehyde polymers;
v) oxyalkylated cardanol, butyl phenol and formaldehyde polymers;
vi) oxyalkylated cardanol, alkyl phenol and formaldehyde polymers; and
vii) a mixture thereof.

20. The demulsification additive composition as claimed in claim 14, wherein the composition comprises:
a) the component (a) in an amount varying from about 99.1% to about 0.1% by weight of the total composition;
b) the component (b) in an amount varying from about 0.1% to about 99.1% by weight of the total composition; and
c) the component (c) in an amount varying from about 0.1% to about 99.1% by weight of the total composition,
depending upon the nature of the water-in-oil emulsion to be treated.

21. The demulsification additive composition as claimed in claim 14, wherein the molecular weight of the demulsifier varies from about 1000 to about 20000 daltons as measured by Gel Permeation Chromatography (GPC) using the tetrahydrofuran (THF) as solvent.

22. The demulsification additive composition as claimed in claim 14, wherein the composition does not comprise:
(i) glycolic acid;
(ii) glyoxylic Acid;
(iii) citric acid; and
(iv) maleic anhydride.

23. A method of demulsification of water-in-oil emulsion, wherein the water-in-oil emulsion is treated with the demulsification additive composition as claimed in claim 14, wherein the water-in-oil emulsion is caused by mixing a wash water and a crude oil; and wherein the step of treatment is carried out by adding the demulsification additive composition to the water-in-oil emulsion for demulsification of the water-in-oil emulsion.

24. The method as claimed in claim 23, wherein the water-in-oil emulsions is caused by mixing the wash water and the crude oil in a desalter unit of a refinery.

25. A method of using the demulsification additive composition as claimed in claim 14 for demulsification of a water-in-oil emulsion,
   wherein the water-in-oil emulsion is caused by mixing a wash water and a crude oil; and wherein the demulsification additive composition is added to the water-in-oil emulsion for demulsification of the water-in-oil emulsion.

26. The method as claimed in claim 25, wherein the water-in-oil emulsions is caused by mixing the wash water and the crude oil in a desalter unit of a refinery.

\* \* \* \* \*